US012704627B2

(12) United States Patent
Sakuma et al.

(10) Patent No.: US 12,704,627 B2
(45) Date of Patent: Aug. 11, 2026

(54) ULTRASONIC IMAGING DEVICE

(71) Applicant: THE UNIVERSITY OF TOKYO, Tokyo (JP)

(72) Inventors: Ichiro Sakuma, Tokyo (JP); Naoki Tomii, Tokyo (JP); Takumi Noda, Tokyo (JP); Takashi Azuma, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 175 days.

(21) Appl. No.: 18/685,961

(22) PCT Filed: Aug. 26, 2022

(86) PCT No.: PCT/JP2022/032207

§ 371 (c)(1),
(2) Date: Feb. 23, 2024

(87) PCT Pub. No.: WO2023/027172

PCT Pub. Date: Mar. 2, 2023

(65) Prior Publication Data

US 2024/0369706 A1 Nov. 7, 2024

Related U.S. Application Data

(60) Provisional application No. 63/237,178, filed on Aug. 26, 2021.

(51) Int. Cl.
*G01S 15/89* (2006.01)
*G01S 7/52* (2006.01)

(52) U.S. Cl.
CPC ...... *G01S 15/8993* (2013.01); *G01S 7/52046* (2013.01)

(58) Field of Classification Search
CPC ......................... G01S 15/8993; G01S 7/52046
See application file for complete search history.

(56) References Cited

U.S. PATENT DOCUMENTS

2021/0204904 A1 7/2021 Tomii et al.

FOREIGN PATENT DOCUMENTS

JP 2021049073 A * 4/2021
WO 2019/211171 A1 11/2019
WO 2020/085312 A1 4/2020

OTHER PUBLICATIONS

Oct. 11, 2022 International Search Report issued in International Patent Application No. PCT/JP2022/032207.

* cited by examiner

*Primary Examiner* — Abdallah Abulaban
(74) *Attorney, Agent, or Firm* — Oliff PLC

(57) ABSTRACT

An ultrasonic imaging device has a learning result as a relationship between the ultrasonic reception data and the shape data obtained by deep learning using the ultrasonic reception data of an imaging target obtained by transmitting and receiving ultrasonic signals by the plurality of element and the shape data of the pedestal (arrangement of multiple elements). Then the ultrasonic imaging device obtains the estimated shape data as the estimated shape data of the pedestal (estimated arrangement of multiple elements) by applying the learning result to the ultrasonic reception data, and constructs an image of the imaging target based on the estimated shape data and the ultrasonic reception data.

8 Claims, 5 Drawing Sheets

ULTRASONIC IMAGING DEVICE

This is a national phase application of PCT/JP2022/032207 filed Aug. 26, 2022, the contents of which are incorporated herein by reference.

TECHNICAL FIELD

The present disclosure relates to an ultrasonic imaging device, in particular, to an ultrasonic imaging device equipped with a probe having a plurality of element capable of transmitting and receiving ultrasonic signals arranged in alignment on a pedestal formed by a deformable plate-like material.

BACKGROUND

As a conventional technology of this kind, inventors have proposed an ultrasonic imaging device equipped with a probe having a plurality of element capable of transmitting and receiving ultrasonic signals arranged in alignment on a pedestal formed by a deformable plate-like material (see Patent Document 1). This ultrasonic imaging device estimates the shape of the pedestal by adjusting the assumed shape so that the index becomes smaller. The index is an index that becomes smaller the smaller the difference between the assumed shape assumed as the shape of the pedestal and the actual shape of the pedestal, and is a shape index based on the luminance of each pixel of the provisional imaging image composed based on the ultrasonic signals received by the plurality of element when the assumed shape is used.

CITATION LIST

Patent Literature

PTL1: Japanese Patent Application Laid-Open No. 2021-049073

SUMMARY

However, in the ultrasonic imaging device described above, it is necessary to repeat the assumption of the assumed shape and the calculation of the shape index that assumes the hypothetical shape of the pedestal and becomes smaller as the difference from the actual pedestal becomes smaller until the shape index becomes less than the allowable value. This requires time for repeated calculations and makes it difficult to perform real-time imaging.

The main purpose of the ultrasonic imaging device is to quickly estimate the shape of the probe's pedestal (arrangement of multiple elements).

The ultrasonic imaging device of the present disclosure has adopted the following measures to achieve the main objectives described above.

The ultrasonic imaging device of the present disclosure includes a probe having a plurality of element capable of transmitting and receiving ultrasonic signals arranged in alignment on a pedestal formed from a deformable plate-like material: wherein the ultrasonic imaging device has a learning result as a relationship between the ultrasonic reception data and the shape data obtained by deep learning using the ultrasonic reception data of an imaging target obtained by transmitting and receiving ultrasonic signals by the plurality of element and the shape data of the pedestal; and the ultrasonic imaging device obtains the estimated shape data as the estimated shape data of the pedestal by applying the learning result to the ultrasonic reception data, and constructs an image of the imaging target based on the estimated shape data and the ultrasonic reception data.

The ultrasonic imaging device of the present disclosure has a learning result as a relationship between the ultrasonic reception data and the shape data obtained by deep learning using the ultrasonic reception data of an imaging target obtained by transmitting and receiving ultrasonic signals by the plurality of element and the shape data of the pedestal. The ultrasonic imaging device obtains the estimated shape data as the estimated shape data (arrangement of multiple elements) of the pedestal by applying the learning result to the ultrasonic reception data, and constructs an image of the imaging target based on the estimated shape data and the ultrasonic reception data. Since the estimated shape data is estimated using learning result obtained by deep learning using ultrasonic reception data and shape data in advance, the estimated shape data (arrangement of multiple elements) can be estimated more quickly than with iterative calculations using shape indices. As a result, images of the imaging target obtained based on the estimated shape data and ultrasonic reception data can be output in near real-time.

In the ultrasonic imaging device of the present disclosure, the estimated shape data may be a sequence of coefficients of each basis function in a shape function represented by a linear combination of any sequence of basis functions. In this case, the shape function may be $P(1)\sin(x)+P(2)\sin(2x)+ \ldots +P(n)\sin(nx)$.

In the ultrasonic imaging device of the present disclosure, the deep learning process may use the random shape data of the pedestal and the simulation reception data as the shape data and the ultrasonic reception data to obtain the learning result, wherein the random shape data of the pedestal is the data when the plurality of element are randomly placed on the processed image obtained by edge detection processing on the natural image, and the simulation reception data is obtained by transmitting and receiving ultrasonic signals by the plurality of element in the random shape data against the processed image by simulation. In this way, it is possible to obtain accurate learning result without using actual measured data of the living body, and to estimate estimated shape data with high accuracy. In this case the learning result may be obtained by deep learning using the random shape data and the simulated reception data as the shape data and the ultrasonic reception data, and then performing additional deep learning on the results obtained by this process, using the measured actual shape data of the pedestal and the measured actual reception data by the probe when the probe is attached to the living body as the imaging target, as the shape data and the ultrasonic reception data. That is, fine tuning is performed using measured shape data and measured reception data against learning result that can be obtained using simulated reception data. In this way, the estimated shape data can be estimated with even greater accuracy.

In the ultrasonic imaging device of the present disclosure, the deep learning may obtain the learning result using the measured actual shape data of the pedestal and the measured actual reception data by the probe when the probe is attached to the living body as the imaging target, as the shape data and the ultrasonic reception data. In this way, the estimated shape data can be estimated with high accuracy because the estimated shape data is estimated using the learning result based on the actual measured data of the living body.

DESCRIPTION OF EMBODIMENTS

Figure 1:
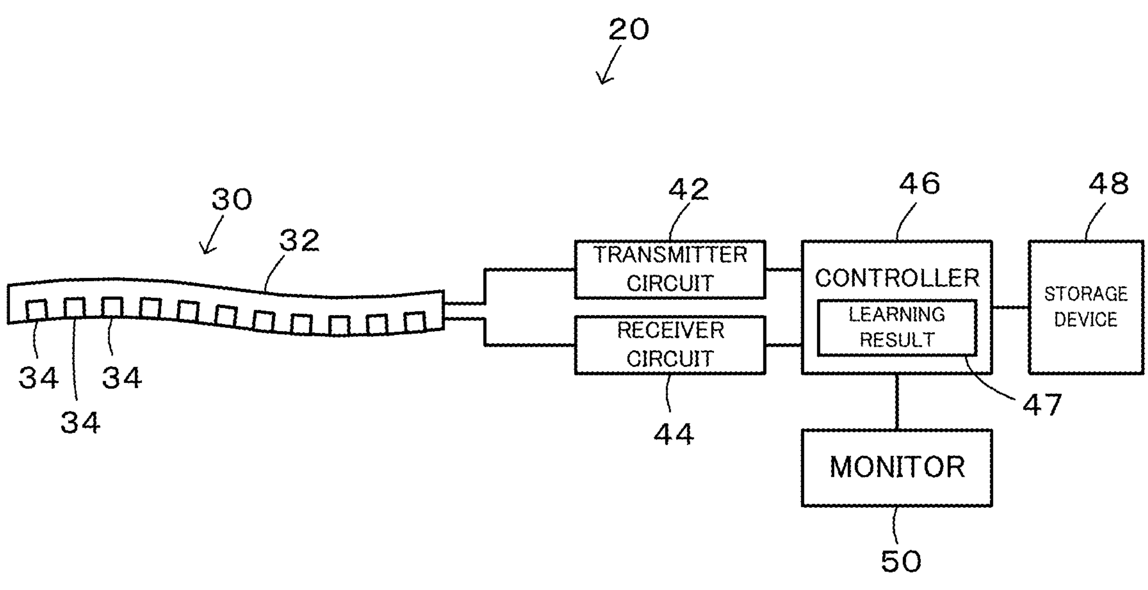
FIG. 1 is a schematic illustration of the configuration of the ultrasonic imaging device 20 of the embodiment.

The following is a description of the embodiment of the disclosure. FIG. 1 is a schematic illustration of the configuration of the 20 ultrasonic imaging device of the embodiment. The ultrasonic imaging device 20 of the embodiment as shown in the figure is equipped with the probe 30 with a plurality of the element 34 capable of transmitting and receiving ultrasonic signals arranged in alignment on the deformable pedestal 32, the transmitter circuit 42 for transmitting ultrasonic signals from a plurality of the element 34, the receiver circuit 44 for receiving ultrasonic signals from a plurality of the element 34, the controller 46 for driving the transmitter circuit 42 and processing the ultrasonic signals received by the receiver circuit 44, the storage device 48 for storing data based on a control signal from the controller 46, and the monitor 50 which is display-controlled by the controller 46.

The pedestal 32 of the probe 30 is formed of a deformable material such as flexible resin, and a plurality of the element 34 are arranged in alignment in one or more rows at predetermined intervals.

The transmitter circuit 42 is a general well-known circuit that adjusts the timing of the ultrasonic signal transmitted from each of the element 34. The receiver circuit 44 is a generally well-known circuit that digitizes the ultrasonic signals received by each of the element 34.

The controller 46 is composed of a microcomputer with a CPU at its core. The controller 46 is equipped with in addition to the CPU, ROM for storing programs, RAM for temporarily storing data, a GPU (Graphics Processing Unit) for rapid image processing, flash memory, input/output circuits, and other devices. The controller 46 stores in ROM the learning result 47 for estimating the shape of the probe 30 (shape of the pedestal 32), that is, the arrangement of a plurality of the element 34.

Figure 2:
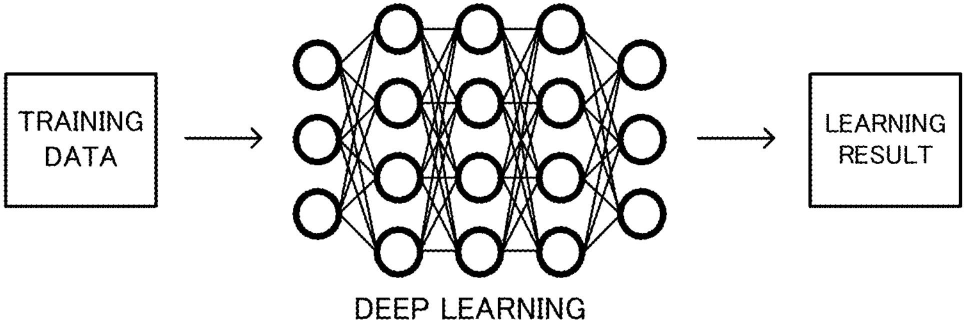
FIG. 2 is a schematic illustration of the deep learning process to obtain the learning result 47.

The learning result 47 is the result obtained by deep learning using the training data, as illustrated in FIG. 2. As the training data, in this embodiment, the data of the shape of the probe 30 (shape of the pedestal 32 and arrangement of a plurality of the element 34) (the shape data) and the data received by a plurality of the element 34 when the probe 30 is attached to the imaging target with deformation and ultrasonic signals are transmitted and received from a plurality of the element 34 (the ultrasonic reception data). The learning result 47 derives the data (the estimated shape data) of the shape of the pedestal 32 (the arrangement of a plurality of the element 34) that is estimated given the ultrasonic reception data. The shape data and the estimated shape data are the parameters P(1), P(2), . . . , P(n) when the shape f(P1, P2, . . . , Pn) on the straight line of the pedestal 32 is the following formula (1) for a plurality of the element 34 that are arranged in a straight line, x is set to range from 0 to π as the estimated shape. In the embodiment, the eleventh and subsequent orders for n=10 are omitted (Equation (2)).

$$f(P1, P2, \ldots, Pn) = P(1)\sin(x) + P(2)\sin(2x) + \cdots + P(n)\sin(nx) \tag{1}$$

$$f(P1, P2, \ldots, P10) = P(1)\sin(x) + P(2)\sin(2x) + \cdots + P(10)\sin(10x) \tag{2}$$

Figure 3:
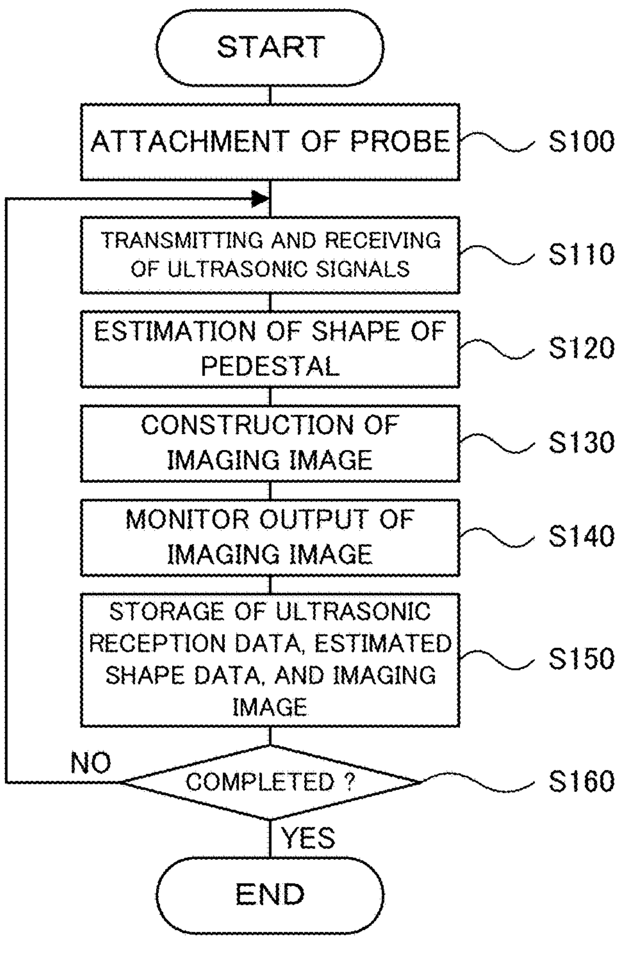
FIG. 3 is a flowchart showing an example of the process when imaging an imaging target by the ultrasonic imaging device 20 of the embodiment.

Next, the operation of the ultrasonic imaging device 20 of the embodiment thus configured when imaging an imaging target will be described. FIG. 3 is a flowchart showing an example of the process when imaging an imaging target by the ultrasonic imaging device 20 of the embodiment. For imaging, the probe 30 is first attached by pressing and deforming it against the imaging target (step S100). Next, the controller 46 transmits and receives ultrasonic signals from a plurality of the element 34 (step S110), and applies the received ultrasonic reception data to the learning result 47 to derive the estimated shape data, which is estimated as the shape of the probe 30 (shape of the pedestal 32 and arrangement of a plurality of the element 34) (step S120).

Figure 4:
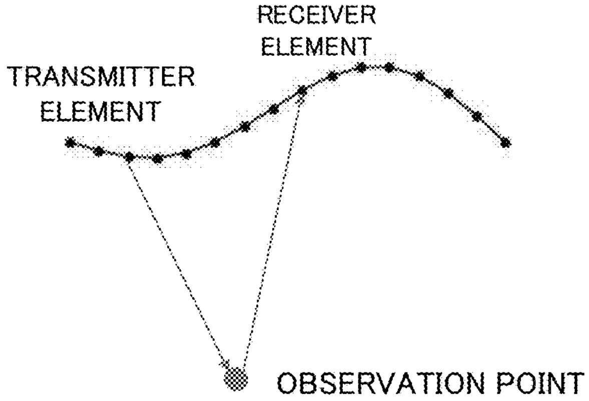
FIG. 4 is an illustration of the calculation of the propagation time t until the ultrasonic signal transmitted from the transmitter element is received by the receiver element.

Then, the controller 46 constructs an imaging image based on the estimated shape of the probe 30 (the estimated shape data) and the ultrasonic reception data (step S130), and outputs the constructed imaging image on the monitor 50 (step S140). The construction of the imaging image was based on the propagation time t of the wave using the aperture synthesis method with the ultrasonic signals received at each of the element 34. The propagation time t of the wave is as shown in FIG. 4 and is expressed by the following equation (3), where the transmit element coordinates are (Xtr, Ytr), the receive element coordinates are (Xrc, Yrc), the observation point coordinates are (x, y), and the sound velocity is c.

$$t = \left[\left\{(x - X_{tr})^2 + (y - Y_{tr})^2\right\}^{1/2} + \left\{x - X_{tr}\right)^2 + (y - Y_{tr})^2\right\}^{1/2}\right] \div c \tag{3}$$

The controller 46 then stores the ultrasonic reception data, the estimated shape data, and the constructed imaging images in the storage device 48 (step S150), determines whether or not the imaging has been completed (step S160), and returns to the process of transmitting and receiving ultrasonic signals from a plurality of the element 34 in step S110 when it determines that the imaging has not been completed. In this way, steps S110 to S150 are repeatedly executed until the imaging is completed, and the monitor 50 displays the real-time imaging images.

Figure 5:
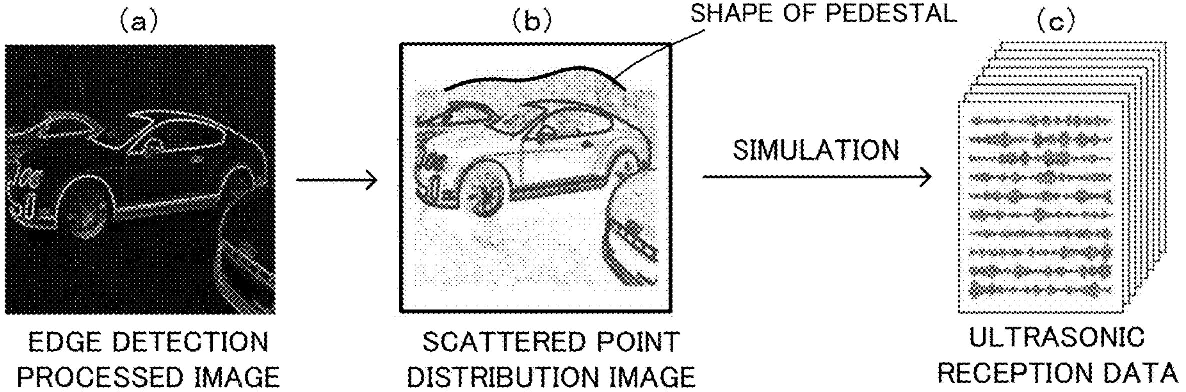
FIG. 5 is an illustration of how a large number of training data (the shape data and the ultrasonic reception data) are obtained by the first method.

Next, the learning result 47 is explained. The first method for obtaining the learning result 47 is a deep learning method that uses the training data adjusted by simulation to obtain learning results. FIG. 5 is an illustration of how a large number of training data (the shape data and the ultrasonic reception data) are obtained by the first method. In the first method, the edge detection processed image ((a) in FIG. 5) is first created by the edge detection process based on the luminance gradient on the natural image. Then, the scattered point distribution image ((b) in FIG. 5) is created, which consists of the scattered points distributed at the density corresponding to the luminance of the edge detection processing image. The ultrasonic reception data ((c) in FIG. 5) received when ultrasonic transmission and reception are performed with a plurality of the element 34 randomly positioned with respect to the scattering point distribution is then generated by simulation. That is, the training data is a set of plurality of the shape data of the arrangement of a plurality of the element 34 randomly arranged (shape of the pedestal 32) and the ultrasonic reception data simulated as being obtained by transmitting and receiving ultrasonic waves from a plurality of the element 34 arranged in correspondence with this shape data. The learning result 47 are obtained by deep learning using the training data obtained by the first such method. Hereafter, the ultrasonic imaging device 20 of the embodiment using the learning result 47 obtained by the first method will be referred to as the first example.

Figure 6:
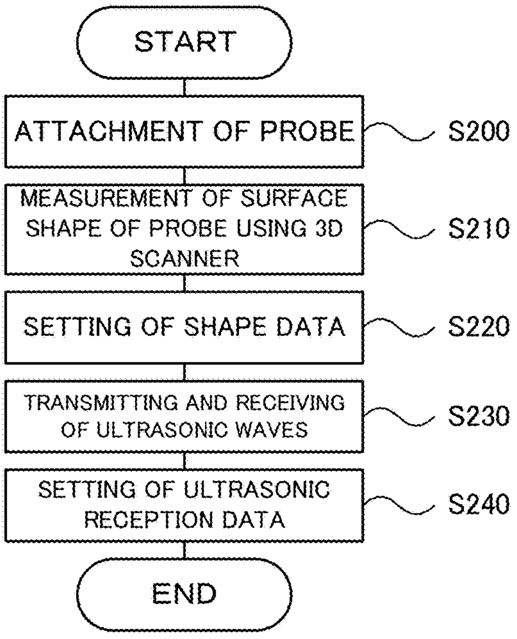
FIG. 6 is a flowchart showing an example of how a large number of training data (the shape data and the ultrasonic reception data) are obtained by the second method.

The second method for obtaining the learning result 47 is a method for obtaining learning results by deep learning using the training data adjusted by the actual measurement data obtained by attaching the probe 30 to the living body. FIG. 6 is a flowchart showing an example of how a large number of training data (the shape data and the ultrasonic reception data) are obtained by the second method. In the second method, the probe 30 is first attached to a body part (calf, front of thigh, back of thigh, belly, back, etc.) (step S200). Then, the surface shape of the mounted probe 30 is measured using the 3D scanner (step S210), and the shape data, which is the arrangement of a plurality of the element 34, is set based on the measured surface shape of the probe 30 (step S220). Then the ultrasonic waves are transmitted and received from a plurality of the element 34 (step S230), and the ultrasonic reception data is set (step S240). The training data are multiple sets of the shape data and the ultrasonic reception data when the probe 30 is attached to each part of the living body. The learning result 47 are obtained by deep learning using the training data obtained by this second method. The ultrasonic imaging device 20 of the embodiment using the learning result 47 obtained by the second method is hereinafter referred to as the second example. If the number of the training data is insufficient due to the actual measurement data obtained by attaching the probe 30 to the living body, the number of the training data may be expanded by gamma-correcting the ultrasonic reception data using various coefficients. In the second example, the number of the training data was increased by a factor of 9 using 9 gamma (Y) values of 0.50, 0.57, 0.67, 0.80, 1.00, 1.25, 1.5, 1.75, and 2.00.

The third method of obtaining the learning result 47 is a method of obtaining the learning result by adjusting the parameters of the learning result obtained by the first method through additional deep learning using the training data based on the actual measurement data obtained by attaching the probe 30 to the living body used in the second method (so-called "fine tuning"). The ultrasonic imaging device 20 of the embodiment using the learning result 47 obtained by the third method is hereinafter referred to as the third example.

Figure 7:
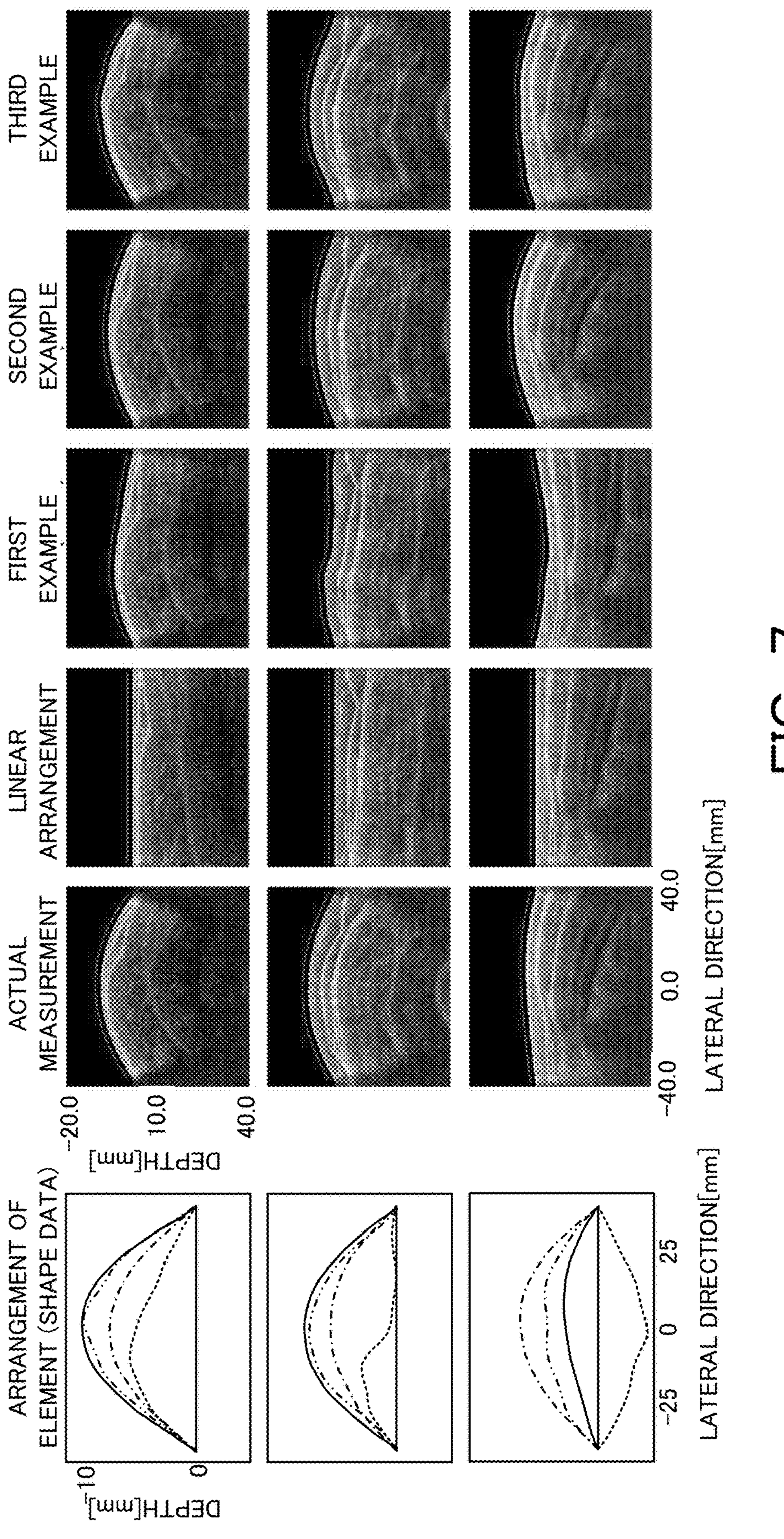
FIG. 7 is an illustration showing an example of the actual measured arrangement of a plurality of the element 34, a linear arrangement assumed to be arranged on a straight line, and the shape data and imaging images of the first to third examples.

FIG. 7 is an illustration showing an example of the actual measured arrangement of a plurality of the element 34, a linear arrangement assumed to be arranged on a straight line, and the shape data and imaging images of the first to third examples. In FIG. 7, the solid curve in "Arrangement of element (shape data)" is the shape data as the actual measurement value, the solid line is the shape data in a linear arrangement assuming that a plurality of the element 34 are arranged in a straight line, the dashed line is the estimated shape data estimated by the first example, the single-dotted line is the estimated shape data estimated by the second example, the double-dashed line is the estimated shape data estimated by the third example. As for the shape data, in the upper and middle rows of FIG. 7, the first, second, and third examples approach the actual measured values in the order of the first, second, and third examples, respectively, compared to the linear arrangement, and in the lower row of FIG. 7, the second and third examples approach the actual measured values in the order of the second and third examples, respectively, compared to the linear arrangement. Note that in the lower part of FIG. 7, the estimated shape data in the first example is farther away from the actual measurement than in the linear arrangement. The imaging images constructed based on the shape data (the estimated shape data) and the ultrasonic reception data, as well as the shape data, approach the measured values in the order of the first, second, and third examples in the upper and middle rows of FIG. 7, compared to the linear configuration, and in the lower row of FIG. 7, they approach the measured values in the order of the second and third examples, compared to the linear configuration. Note that in the lower part of FIG. 7, the estimated shape data in the first example is farther away from the actual measurement than in the linear arrangement. These results are considered to be closer to the measured values in the order of the first, second, and third examples compared to the linear arrangement.

Figure 8:
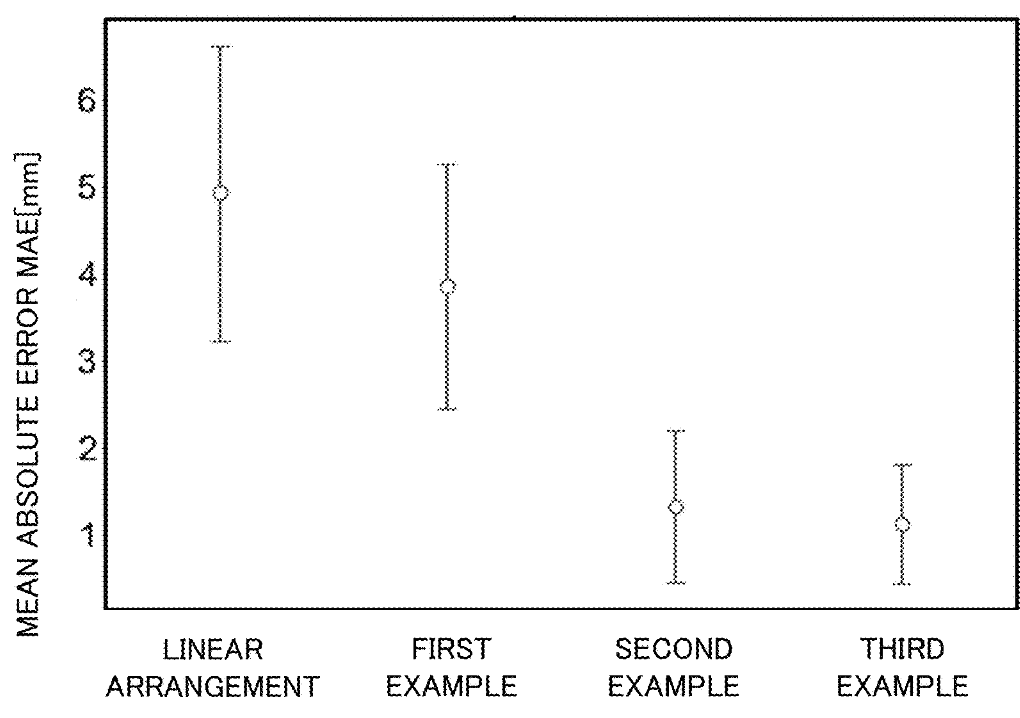
FIG. 8 is an illustration of the mean absolute error MAE for the linear arrangement, the first example, the second example, and the third example with respect to the actual values in the arrangement (the shape data) of a plurality of the element 34.

FIG. 8 is an illustration of the mean absolute error MAE for the linear arrangement, the first example, the second example, and the third example with respect to the actual values in the arrangement (the shape data) of a plurality of the element 34. In the figure, the circles indicate the average value of the mean absolute error MAE, and the straight lines with upper and lower limits indicate the range of the mean absolute error MAE. Compared to the linear arrangement, the mean absolute error MAE is smaller in the order of the first, second, and third examples, and it can be seen that the estimation accuracy of the arrangement of a plurality of the element 34 is better in that order.

Figure 9:
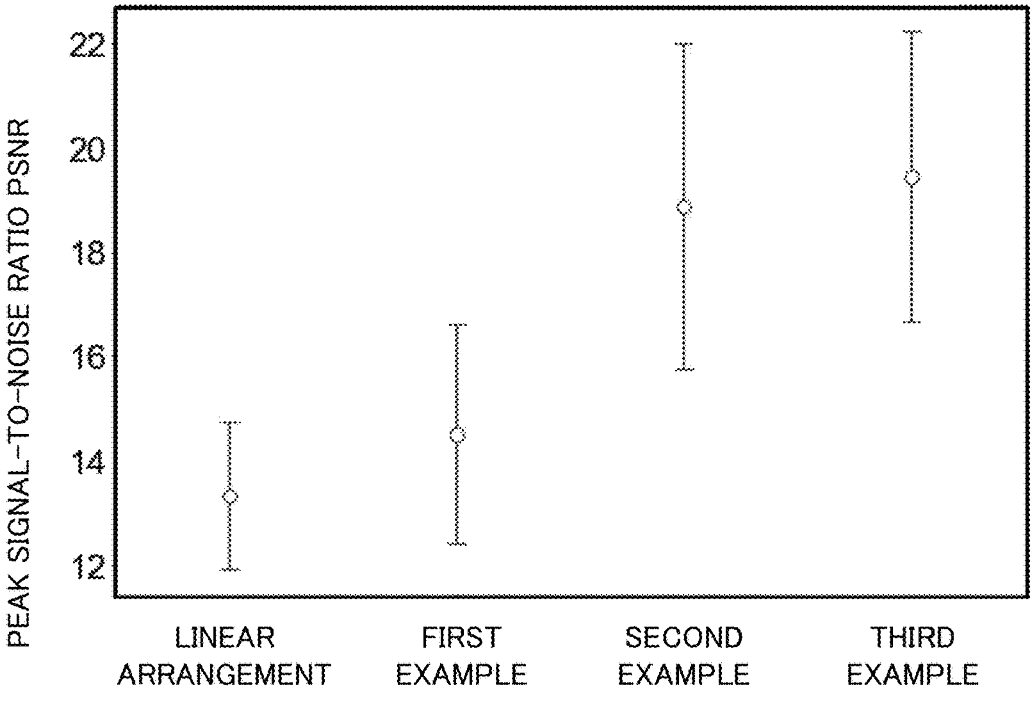
FIG. 9 is an illustration of the linear configuration, the peak signal-to-noise ratio PSNR of the first, second, and third examples with respect to the actual values in the imaging image constructed based on the shape data (the estimated shape data) and the ultrasonic reception data.

FIG. 9 is an illustration of the linear configuration, the peak signal-to-noise ratio PSNR of the first, second, and third examples with respect to the actual values in the imaging image constructed based on the shape data (the estimated shape data) and the ultrasonic reception data. In the figure, the circles indicate the average of the peak signal-to-noise ratio PSNR, and the straight lines with upper and lower limits indicate the range of the peak signal-to-noise ratio PSNR. The peak signal-to-noise ratio PSNR is larger in the order of the first, second, and third examples compared to the linear arrangement, and it can be seen that the image quality of the constructed imaging images is more accurate in that order.

The ultrasonic imaging device 20 of the embodiment is equipped with the learning result 47 that is obtained by deep learning using data of the shape of the probe 30 (the shape data: shape of the pedestal 32, arrangement of a plurality of the element 34) and data received by a plurality of the element 34 when ultrasonic signals are transmitted and received from a plurality of the element 34 while the probe 30 is pressed against the object to be imaged and deformed (the ultrasonic reception data) as the training data. The ultrasonic imaging device 20 of the embodiment repeats the process of estimating the estimated shape data by applying the ultrasonic reception data obtained by transmitting and receiving ultrasonic waves from a plurality of the element 34 of the probe 30 attached to the imaging target to the learning result 47, constructing an imaging image based on the estimated shape data and the ultrasonic reception data, and outputting the constructed imaging image to the monitor 50. Since the estimated shape data is estimated using the learning results 47 obtained by deep learning using the ultrasonic reception data and the shape data in advance, the estimated shape data can be estimated more quickly than those with iterative calculations using the shape index. As a result, the imaging image constructed based on the estimated shape data and the ultrasonic reception data can be output to the monitor 50 in near real-time.

The ultrasonic imaging device 20 in the first example prepares a large number of the shape data and the ultrasonic reception data using natural images, so the learning result 47 can be obtained without having to attach the probe 30 to the biological site and obtain actual measurements.

The ultrasonic imaging device 20 in the second example obtains the learning result 47 based on actual measurements obtained by attaching the probe 30 to a biological site, so the learning result 47 can be more appropriate compared to one that obtains the learning result 47 using natural images. As a result, a more appropriate imaging image can be constructed.

The ultrasonic imaging device 20 in the third example applies fine tuning to the learning result 47 used in the ultrasonic imaging device 20 in the second example to obtain the learning result 47, such that a more appropriate the learning result 47 can be obtained and a more appropriate imaging image can be constructed compared to the ultrasonic imaging device 20 in the second example.

In the ultrasonic imaging device 20 of the embodiment, for ease of explanation, we have considered the case in which a plurality of the element 34 are arranged in alignment on the pedestal 32 in a straight line in one row at predetermined intervals. However, a plurality of the element 34 may be aligned and arranged in a straight line in one row at random intervals on the pedestal 32, or a plurality of the element 34 may be aligned and arranged in multiple rows on the pedestal 32.

The above is a description of the form for implementing the present disclosure using the embodiment. However, the present disclosure is not limited in any way to these embodiments, and can of course be implemented in various forms within the scope that does not depart from the gist of the present disclosure.

INDUSTRIAL APPLICABILITY

The technique of the present disclosure can be used in the manufacturing industry for the ultrasonic imaging device and other applications.

The invention claimed is:

1. An ultrasonic imaging device equipped with a probe having a plurality of elements capable of transmitting and receiving ultrasonic signals arranged in alignment on a pedestal formed from a deformable plate-like material:

wherein the ultrasonic imaging device has a learning result as a relationship between ultrasonic reception data and shape data obtained by deep learning using the ultrasonic reception data of an imaging target obtained by transmitting and receiving ultrasonic signals by the plurality of elements and the shape data of the pedestal; and the ultrasonic imaging device is configured to:

obtain estimated shape data as the estimated shape data of the pedestal by applying the learning result to the ultrasonic reception data, construct an image of the imaging target based on the estimated shape data and the ultrasonic reception data, and output the constructed image to a display in real-time.

2. The ultrasonic imaging device according to claim 1, wherein the estimated shape data is a sequence of coefficients for each basis function in a shape function represented by a linear combination of any sequence of basis functions.

3. The ultrasonic imaging device according to claim 2, wherein the shape function is $P(1)\sin(x)+P(2)\sin(2x)+ \ldots +P(n)\sin(nx)$.

4. The ultrasonic imaging device according to claim 2, wherein the deep learning process uses the random shape data of the pedestal and the simulation reception data as the shape data and the ultrasonic reception data to obtain the learning result, the random shape data of the pedestal is the data when the plurality of elements are randomly placed on the processed image obtained by edge detection processing on the natural image, and the simulation reception data is obtained by transmitting and receiving ultrasonic signals by the plurality of elements in the random shape data against the processed image by simulation.

5. The ultrasonic imaging device according to claim 3, wherein the deep learning process uses the random shape data of the pedestal and the simulation reception data as the shape data and the ultrasonic reception data to obtain the learning result, the random shape data of the pedestal is the data when the plurality of elements are randomly placed on the processed image obtained by edge detection processing on the natural image, and the simulation reception data is obtained by transmitting and receiving ultrasonic signals by said plurality of elements in said random shape data against said processed image by simulation.

6. The ultrasonic imaging device according to claim 4, wherein the learning result is obtained by deep learning using the random shape data and the simulated reception data as the shape data and the ultrasonic reception data, and then performing additional deep learning on the results obtained by this process, using the measured actual shape data of the pedestal and the measured actual reception data by the probe when the probe is attached to the living body as the imaging target, as the shape data and the ultrasonic reception data.

7. The ultrasonic imaging device according to claim 2, wherein the deep learning obtains the learning result using the measured actual shape data of the pedestal and the measured actual reception data by the probe when the probe is attached to the living body as the imaging target, as the shape data and the ultrasonic reception data.

8. The ultrasonic imaging device according to claim 3, wherein the deep learning obtains the learning result using the measured actual shape data of the pedestal and the measured actual reception data by the probe when the probe is attached to the living body as the imaging target, as the shape data and the ultrasonic reception data.

* * * * *